United States Patent [19]
Kessler

[11] 3,911,074
[45] Oct. 7, 1975

[54] METHOD OF MAKING THIN-WALLED PLASTIC SCREW CAPS

[76] Inventor: Milton Kessler, 6690 Harrington, Youngstown, Ohio 44512

[22] Filed: Nov. 1, 1971

[21] Appl. No.: 194,587

Related U.S. Application Data

[63] Continuation of Ser. No. 869,112, Oct. 24, 1969, abandoned.

[52] U.S. Cl. .................. 264/318; 264/23; 264/323
[51] Int. Cl.² ........................................... B29D 1/00
[58] Field of Search ............. 264/23, 318, 323, 274

[56] References Cited
UNITED STATES PATENTS

| | | | |
|---|---|---|---|
| 2,408,630 | 10/1946 | Green | 264/323 |
| 2,433,546 | 12/1947 | Cornelius | 18/19 |
| 2,918,521 | 12/1959 | Abrams | 264/274 X |
| 3,029,468 | 4/1962 | Valyi | 18/5 |
| 3,184,353 | 5/1965 | Balamuth | 264/23 X |
| 3,487,139 | 12/1969 | Mojonnier | 264/132 |
| 3,493,998 | 2/1970 | Mueller | 18/19 |

*Primary Examiner*—Richard R. Kucia
*Attorney, Agent, or Firm*—Max L. Libman

[57] ABSTRACT

Thin-walled plastic screw caps are made by a two-step method: the first step is to make, by injection molding, a thin-walled plastic cup having a smooth unthreaded side wall, then to hold this cup firmly against axial movement while inserting into it, by axial movement only, a threaded mandrel, while subjecting the mandrel to ultra-sonic vibration, which causes the cup to conform to the threads on the mandrel without any pressure being applied external to the cup, so that when the mandrel is fully seated in the cup, the latter hugs the mandrel and conforms to the thread of the mandrel, thus producing a threaded cup closely hugging the mandrel. The cup is then stripped from the mandrel by rotating a friction wheel against the cup in the proper direction to unscrew the cup from the mandrel. Alternatively, instead of ultra-sonic vibration, external air pressure and heat may be used to make the thin-walled cup conform to the thread of the mandrel.

2 Claims, 9 Drawing Figures

INVENTOR
Milton Kessler

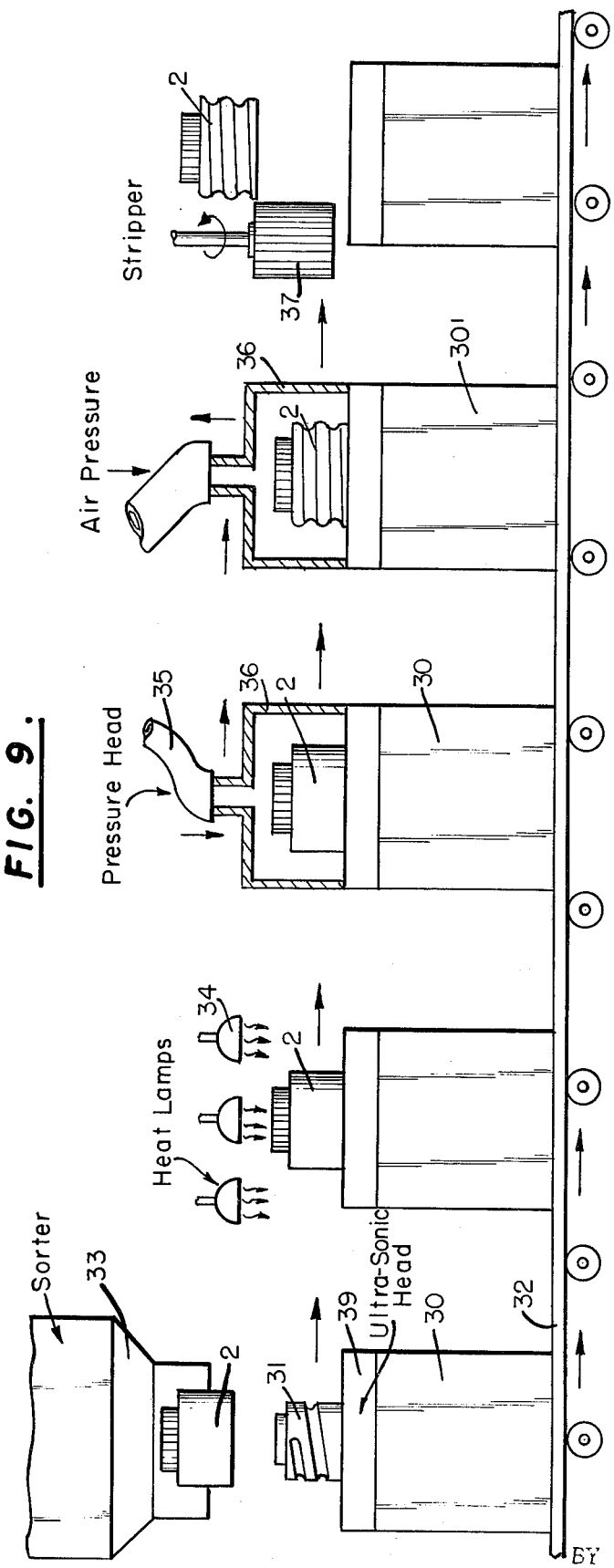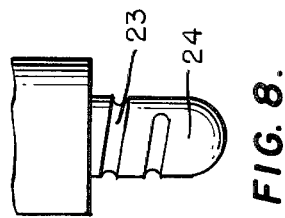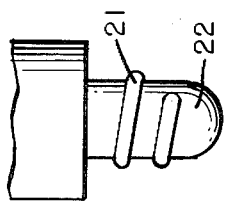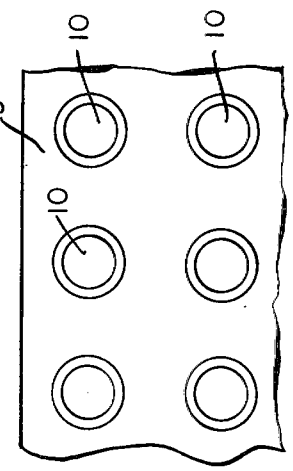

METHOD OF MAKING THIN-WALLED PLASTIC SCREW CAPS

This is a continuation of Application Ser. No. 869,112, filed Oct. 24, 1969, which has been abandoned.

As used in this specification, a "thin-walled plastic screw cap" is a screw cap of the type having a uniform wall thickness throughout the threaded portion of the cap, said cap being formed from an initial thin-walled unthreaded cap which has a uniform thickness at all points along its wall. To form such a thin-walled screw cap, a threaded mandrel is inserted into the initial unthreaded cap while the cap wall is subjected to a sufficiently high temperature to soften it sufficiently so that the cap side wall hugs the mandrel and conforms to the threaded shape of the mandrel at both the inner and the outer surface of the cap.

Thick-walled screw caps, used where a greater strength or a desired outer appearance of the cap is required, have a different external shape from the interior threaded conformation, which is possible because the cap wall is sufficiently thick so that the outer wall does not follow the configuration or shape of the inner screw thread; thick-walled caps are therefore necessarily not of uniform wall thickness. The term "uniform wall thickness", as used herein, means that the thickness does not vary substantially at all points along the wall.

Thin-walled plastic screw caps are presently made from thin sheets of thermoplastic material by the well-known process of vacuum theremoforming, using heat and vacuum. Typically, this process is highly wasteful of plastic material, as some 40 percent of the sheet material becomes scrap, thus increasing the cost of the product. Also, the cap must be unscrewed from the cavity on which it is formed, since it has a thread and cannot be stripped directly, and this requires relatively complicated machinery for performing this unscrewing operation.

The present invention solves the above problem in the following manner: First a thin-walled plastic cup is made by injection molding, which produces very little scrap and therefore has a high utilization of material; then a thread is formed on this cup by holding it firmly against axial movement while inserting into it a threaded mandrel in such a manner so as to cause the cup to conform to the threads on the mandrel so that when the mandrel is fully seated in the cup, the latter hugs the mandrel and conforms to the thread of the mandrel, thus producing a threaded cup. The cup is then stripped from the mandrel by rotating a friction wheel against the cup in the proper direction to unscrew the cup from the mandrel. Alternatively, instead of ultra-sonic vibration, heat and air pressure may be employed, as will be described below. This insertion of the mandrel into the cup cannot, of course, be performed with a mere application of force, as the cup material is too rigid for this, and would only split. To prevent this, a variety of expedients can be employed, for example, the mandrel can be subjected to ultrasonic vibration during the insertion, and the resulting heat and vibratory motion will enable the mandrel to be inserted into the cup by axial motion, with the cup material distorting sufficiently to permit entry of the mandrel until it is fully seated in the cup, after which the cup remains on the mandrel as a tightly-fitting "skin" conforming to the threaded shape of the mandrel, so that a threaded cup has now been formed tightly hugging the mandrel. After this, the mandrel is moved against a rotating friction wheel which unscrews the cup from the mandrel or rotating jaws, the ultra-sonic vibration having been stopped during this unscrewing process, so that a fully-formed thin-walled cup falls away from the mandrel. Heat can be used to soften the cup while the mandrel is being inserted into it, thus permitting the cup to conform to the shape of the mandrel. If desired, the mandrel can be rotated in the proper direction so that it is "threaded" into the cup during this process of insertion. The heat can be supplied either by a partly heated mandrel or by supplying it to a recess in which the cup is seated during the insertion process, as will be explained in more detail below, or by preheating the plastic cup. In addition, air pressure can be applied to the outside of the cup after the mandrel has been inserted.

The specific nature of the invention, as well as other objects and advantages thereof, will clearly appear from a description of a preferred embodiment as shown in the accompanying drawing, in which:

FIG. 6 is a fragmentary showing of a multiple-mold block for making caps;

FIGS. 7 and 8 show two alternative forms of mandrel; and

FIG. 9 illustrates an automatic belt conveyor system for forming thin-walled caps by heat and air pressure.

Figure 1:
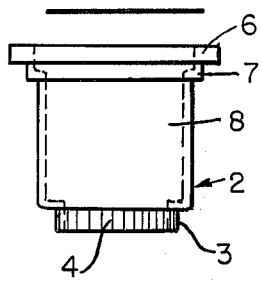
FIG. 1 is a side view and FIG. 2 is a bottom view of a smooth-walled plastic cup prior to formation of the threads.
Figure 2:
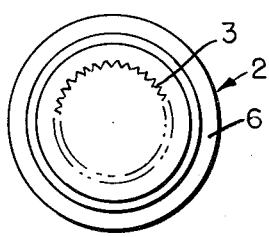
Figure 3:
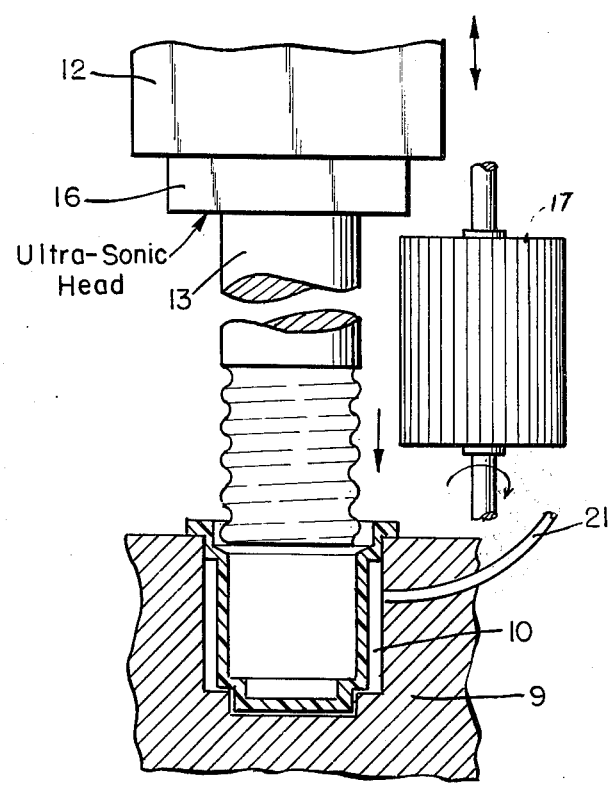
FIG. 3 is a sectional view of the same cup seated in a recess of a metal block with the mandrel about to enter it for thread formation.
Figure 4:
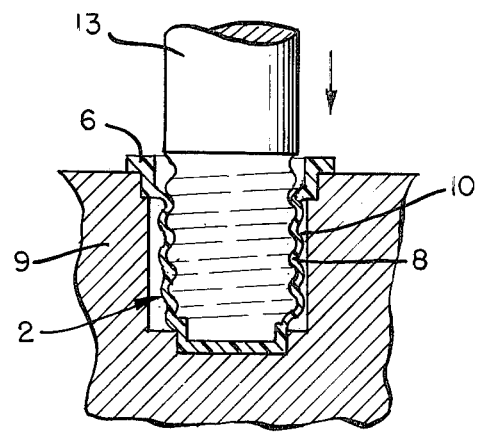
Fig. 4 shows the same cup with the mandrel fully seated.
Figure 5:
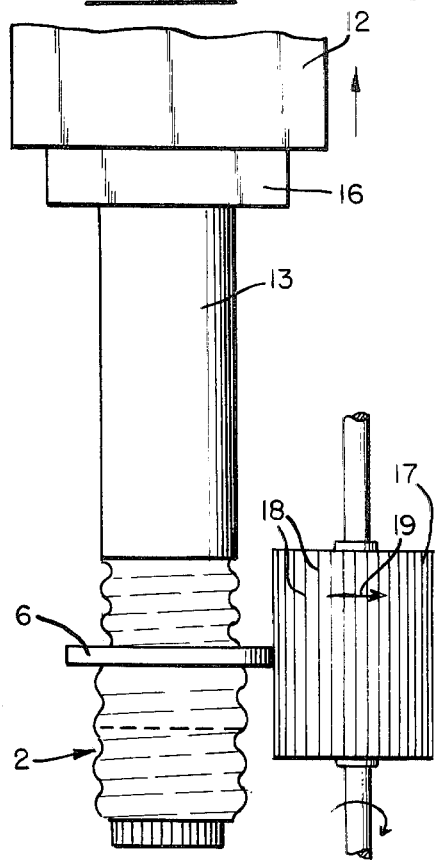
FIG. 5 shows the mandrel withdrawn and the process of stripping the cup from the mandrel.

FIGS. 1 and 2 show the thin-walled cup 2 prior to thread formation. This cup can be formed by injection molding in a conventional manner well-known to the art, and presents no difficulty because it does not have any threads, therefore, it can readily be removed from the mold as is well-known in the art. The cup 2 is preferably provided with a top of reduced diameter 3 provided with short axial ridges 4 which furnish a useful finger grip in removing the cap from the threaded neck of a bottle or other container on which it is ultimately set. The cup is provided with a beaded rim 6 and a lead portion 7 of slightly larger diameter than the main diameter of the cylindrical wall 8 of the cap. These cups are typically formed in a multiple mold at a very high rate of manufacture and are then dropped into a sorter, which is a commercially available piece of equipment, for example, the "Syntron" (made by F. M. C. Corp.), which conveys them to a metal block 9 (FIG. 6) having a number of cavities 10 into which the cups are set in inverted position as shown in FIG. 3. A threading head 12 bearing a number of mandrels 13, one corresponding to each recess 10 in the block 9, is then moved downwardly in the position shown by the arrow in FIG. 3, which shows the action of a single mandrel and a single cup, it being understood that the same occurs at each cup location simultaneously. Each mandrel 13 is provided with an ultra-sonic head 16 so that the entire mandrel is subjected to ultra-sonic vibration while it is forced down into the plastic cup 2. Ultra-sonic heads are now commercially available, and ultra-sonic welding of thermoplastic materials is now conventional in the art. The effect of the ultra-sonic vibrations is to heat the plastic, and also to permit the mandrel to enter it freely while distorting the plastic shell until the mandrel is a fully seated as shown in FIG. 4, with the plastic shell 2 now conforming to the shape of the mandrel and closely hugging the mandrel. At this point, the ultrasonic vibration is stopped, and the mandrell with the fully-formed, threaded cup is withdrawn from the recess 10 as shown in FIG. 5, and pulled back sufficiently far so that the rim or bead 6 engages a friction wheel 17, which may be knurled or axially grooved as shown at 18, and which is rotated in the direction shown by the arrow 19 so that it unscrews the fully formed cup 2 from the mandrel, this action being simultaneously repeated on all of the other mandrels of the thread-forming assembly, whereby all of the formed cups are simultaneously stripped from the mandrels for collection and use. The insertion of the vibrating mandrel into the cup can be performed in a fraction of a second, so that the entire operation is very rapid. While this is taking place, a different set of cups is being inserted by the sorter into the recesses 10, and the operation is therefore repeated at a very high rate of speed.

If desired, a principle of pressure-forming can be added to the above operation by providing air pressure to the exterior of the cup by means of a pipe 21 so that there is pressure on the outside to insure that the cup will closely hug the exterior of the mandrel while the cup is in a softened and heated condition by virtue of the ultra-sonic vibration. With pressure forming, the heat may also be supplied by conventional heating means instead of by the use of ultra-sonic vibrations, i.e., the metal block 9 may be suitably heated in any known fashion, as by the use of electrical heating elements, and the mandrel may also be warmed slightly, although not sufficiently to by itself make the cup material too soft, so that when the mandrel is withdrawn from the recess, the cup is sufficiently hard without the additional heat supplied by the block 9 so that it can be stripped from the mandrel by the friction wheel 17, or in any other manner, without distorting the cap so that it would be useless for its intended purpose.

If desired, the mandrel can be mounted so that it is capable of free rotation about its own axis, whereby as it enters the cup it tends to follow the thread which it is making in the cup wall, rather than distorting the material back and forth as the mandrel enters the cup. For example, this type of operation can be performed with Bronson ultra-sonic equipment now available.

FIG. 7 shows a form of mandrel used wherein the mandrel maximum diameter is larger than the cup. In this case, the threads 21 are formed extending outwardly from the mandrel cylinder 22, which is substantially the same diameter as the inside of the cup or slightly smaller, so that the threads 21 displace the cup material outwardly. FIG. 8 shows a form of mandrel used in which the threads 23 are cut into the mandrel cylinder 24, which has an outside diameter substantially the same as the inside diameter of the cup. In this case, the threads 23 permit the cup material to flow inwardly, preferably under the influence of external pressure.

FIG. 9 illustrates a continuous process of forming cups by heat and air pressure. A series of mandrels 31 are mounted on a moving belt 32 so as to pass successively through a number of stations. At the first station, the unthreaded, plain-walled caps 2 are dropped from sorter 33 onto mandrel 31, or otherwise placed thereby automatic machinery such as commercially available. At the second station, the cap 2 now sitting on mandrel 31 is subject to heat, as indicated by heat lamps 34, although any other conventional method of heating may be employed. At the next station pressure head 36 is dropped over the carrier 30 so as to enclose the cap 26, and travels for a short distance to position 30', while a pulse of high pressure air (or other gas) is supplied through tube 35 from a suitable pressure source. Alternatively, the motion of conveyer belt may be such that it stops at each of these stations for a sufficient length of time to enable each particular operation to be performed. It will be noted that in vacuum forming, the maximum pressure differential which can be obtained is 15 pounds per square inch, but in pressure forming of the above described type, pressures as high as 100 pounds per square inch, or more, may be employed. By making the threads cut into mandrel 31 sufficiently deep, the pressure of air trapped within the thread cut can be overcome, or alternatively, venting means can be provided in the mandrel for such trapped air, or a vacuum may even be employed, although this would add greatly to the expense, and in most practical situations can be dispensed with.

Continuing with the conveyor belt 32, after the cap has been provided with a thread by the air pressure above described, the mandrel continues to the next station, where a rotary stripper 37 similar to that described in FIG. 5 strips the cap from the mandrel. Although only a single unit has been shown at each stage in FIG. 9, it will be understood at actually the belt may be of considerable width and a considerable number of such units may be placed side-by-side, thus greatly increasing the output of the machine. Instead of, or in addition to heat lamps 34, the base 30 may be provided with an ultra-sonic head as in FIG. 3, as shown at 39.

It will be understood that the invention is not limited to the exact embodiment shown and that various modifications can be made in construction and arrangement within the scope of the invention.

I claim:

1. a. Method of making a thin-walled plastic screw cap having a uniform wall thickness of the thread portion of the cap comprising the steps of
   b. providing a thin-walled unthreaded cup having a substantially cylindrical wall of substantially uniform thickness at all points along the wall;
   c. inserting into said cup a threaded mandrel slightly larger in external diameter than the inside diameter of the cup while subjecting the cup to a sufficiently high temperature to soften its walls sufficiently so that the cup side wall hugs the mandrel and conforms closely to the threaded shape of the mandrel both at the inner surface and at the outer surface of the cup so as to retain its wall thickness substantially uniform,
   d. allowing the cup to cool sufficiently to retain the threaded shape imparted to it by the mandrel,
   e. unscrewing the thus threaded cup from the mandrel,
   f. said cup being held in a retainer having a smooth-walled recess of sufficiently large diameter to accommodate the threaded cup after insertion of the mandrel, without binding, g. said cup having a beaded rim which rests on the surface of said retainer when the cup is in the recess, said beaded rim being thicker, and therefore stronger, than the wall of the cup, h. said unscrewing operation being accomplished by holding a rotating friction wheel against the said beaded rim of the cup so as to spin it off the mandrel, while holding the mandrel against rotation.

2. The invention according to claim 1, said cup being heated during insertion of the mandrel sufficiently to soften the side wall of the cup, while subjecting the beaded rim to less heat than the side wall.

* * * * *